Aug. 8, 1933.  A. G. F. WALLGREN ET AL  1,921,958

BEARING

Filed Oct. 18, 1932

INVENTORS
August Gunnar Ferdinand Wallgren
Carl Gustaf Janson
BY Wm T. Hedlund
their ATTORNEY Patented Aug. 8, 1933

1,921,958

UNITED STATES PATENT OFFICE 1,921,958

BEARING

August Gunnar Ferdinand Wallgren and Carl Gustaf Janson, Stockholm, Sweden, assignors to Aktiebolaget Nomy, Stockholm, Sweden, a Corporation of Sweden Application October 18, 1932, Serial 638,309, and in Sweden January 13, 1931

10 Claims. (Cl. 308—73)

Our invention relates to bearings employing a plurality of blocks, and more particularly to bearings having curved sliding surfaces. While not limited to the type of bearing therein disclosed, reference may be had to Wallgren U. S. Pat. No. 1,871,485, granted August 16, 1932, as showing an example of bearing to which the present invention is applicable.

The invention will be described in conjunction with the accompanying drawing forming part of this specification, and of which:

Figure 3:
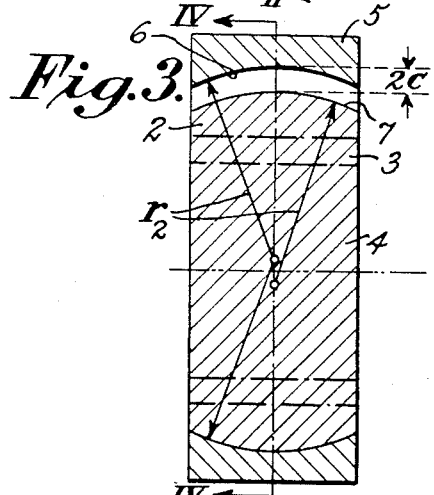
Fig. 3 is a diagrammatic sectional view of a bearing illustrating the invention and may be said to be taken on the line III—III of Fig. 4.
Figure 5:
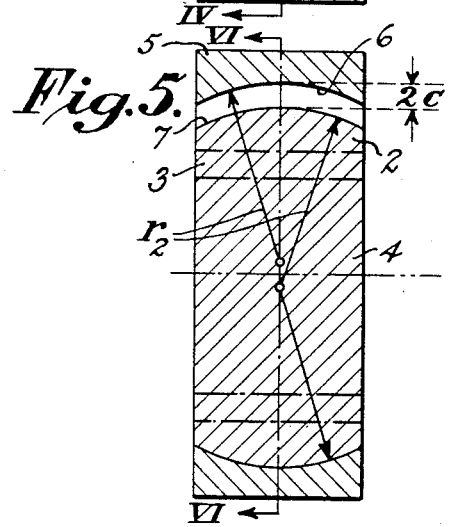
Figure 6:
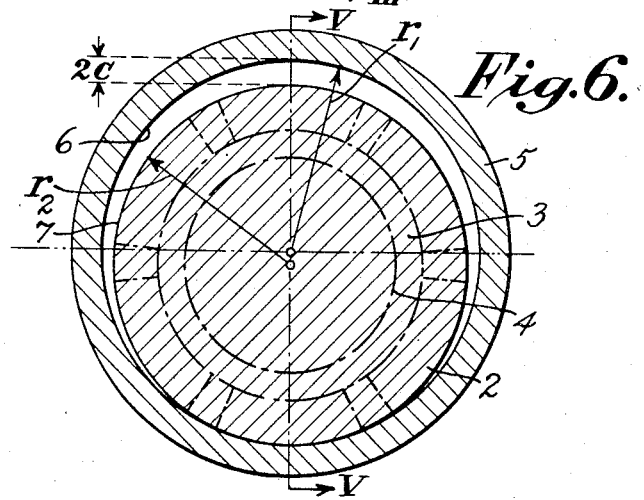

Fgi. 5 is a view similar to Fig. 3, showing a modification, and may be said to be taken on the line V—V of Fig. 6; and Fig. 6 is a transverse sectional view taken on the line VI—VI of Fig. 5.

The bearing comprises a plurality of bearing blocks 2 tiltably supported on a ring element 3, which is an inner member of the bearing aggregate and which may be termed a driving member or driving ring. Ring 3 is secured to the shaft 4 in any desired manner. The bearing includes an outer member 5, which is stationary and is suitably supported and the inside surface 6 of which is spherical and constitutes the stationary sliding surface. The driving ring 3 is provided with abutments 11 which permit and limit peripheral movement of the blocks relative to the driving ring. Also the driving ring is provided with axially extending grooves 8 which together with the surfaces 9 form bearing shoulders a and b against one or the other of which the supporting surfaces 10 of the blocks will bear when the blocks are brought into motion due to rotation of the driving ring and its abutments 11.

Figure 1:
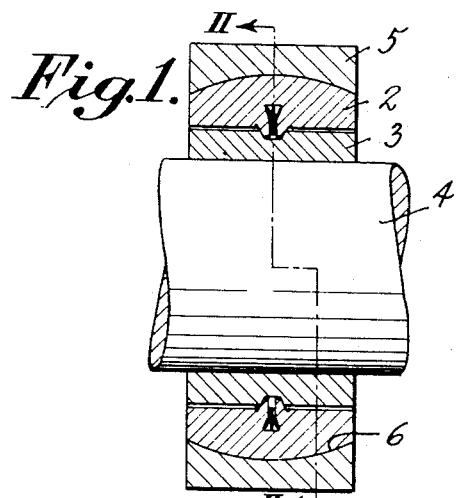
Fig. 1 is an axial cross-sectional view of a bearing embodying the invention, taken on the line II—II of Fig. 1.
Figure 2:
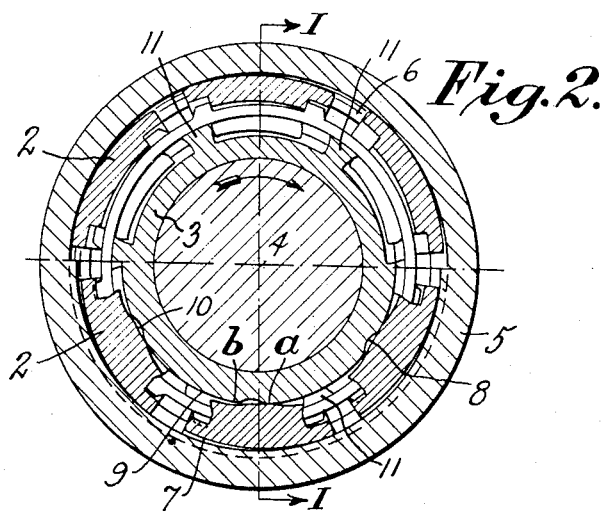
Fig. 2 is a transverse sectional view taken on the line II—II of Fig. 1.

In the direction of rotation indicated by the arrow in Fig. 2 the blocks adjust themselves so that the forward part of their supporting surface 10, considered in the direction of rotation, enters into the corresponding groove 8, the block in this manner being supported at shoulder a. Between the sliding surfaces 7 of the blocks and the stationary sliding surface 6 the characteristic wedge-shaped spaces are formed in which load-sustaining liquid films are produced.

In order to obtain proper operation of bearings of this kind, it is necessary to have play between the stationary and rotating sliding surfaces. It has been proposed to obtain this play in two ways:

(1) The spherical surface or surfaces which constitute the rotating sliding surface of the bearing have been made with a smaller radius than the stationary sliding surface to an extent corresponding to the desired play;

(2) The rotating sliding surfaces of the blocks are formed on the same radius as the stationary sliding surface, the blocks being supported at such distance with respect to the stationary sliding surface that the desired play between the sliding surfaces has been obtained.

In the first case stated, the sperical surfaces have concentric relationship. This concentric relationship is, however, not maintained when the bearing operates, and it will be clear that when the bearing is not operating the load will be carried substantially on the middle parts of the blocks bearing against the middle part of the stationary sliding surface. That is, the load will be sustained by surfaces which are in contact substantially only at a point. The play increases outwardly toward the sides of the bearing, that is, in axial direction. This may be inconvenient, particularly with bearings of great width and relatively large radial play as, for instance, bearings intended to be driven with heavy lubricants, inasmuch as the oil has a tendency to flow outwardly in axial direction from the wedge-shaped spaces between the sliding surfaces. This disadvantage has been apparent particularly when starting rotation before the load-sustaining oil films are as yet set up, as the load in such case is concentrated on small bearing surfaces.

In order to eliminate the above disadvantage it has been proposed to construct the bearing in acordance with the second case above mentioned. In this case, when the bearing is not rotating, a large load-sustaining bearing surface is present between the sliding surfaces, and thus the starting ris facilitated. This construction has, however, produced a disadvantage in that adhesion forces of such magnitude may arise between the cooperating sliding surfaces of the blocks and the stationary part of the bearing that the blocks do not leave the stationary spherical surface when they pass through the unloaded zone of the bearing. This may, under certain load conditions, cause shocks between the blocks and their supporting surfaces when the blocks again enter into the loaded zone of the bearing and again are caused to bear against the supporting surfaces. Such shocks may cause undesirable noise and furthermore may cause deformation of the supporting surfaces and thereby decrease the effective operation of the bearing.

The above described disadvantages are eliminated by the present invention, in accordance with which the block sliding surfaces and the corresponding sliding surface of the race are formed with equal radii of curvature in axial direction, that is, in an axial plane, but with different radii of curvature in peripheral direction, that is, in a plane transverse to the axis of rotation. By giving the sliding surfaces the same radii of curvature in axial direction, the axially extending plays above stated as a disadvantage are avoided, while the adhesion of the blocks to the race is prevented due to the different radii of curvature in peripheral direction.

Figure 4:
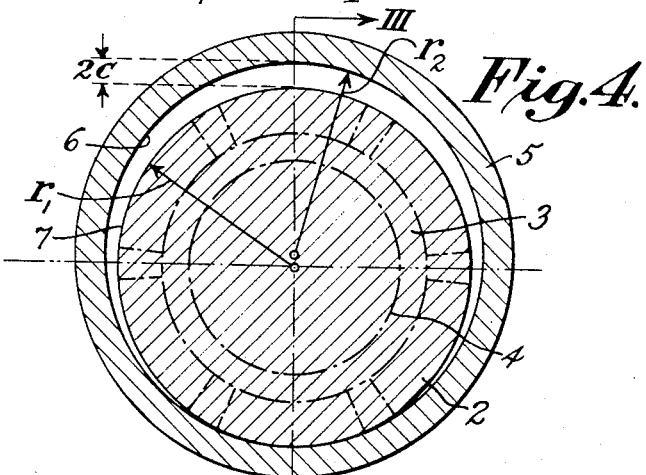
Fig. 4 is a transverse sectional view taken on the line IV—IV of Fig. 3.

Referring now to Figs. 3 and 4, the bearing blocks 2 are indicated by dash-and-dot lines as in their middle positions, that is, in the positions in which they contact both surfaces $a$ and $b$. It is also assumed that the bearing is not rotating and that there is a downwardly directed load, wherefore the rotating and stationary sliding surfaces are in contact at the bottom part of the bearing. The play shown at the upper part of the bearing, therefore, is twice the play with the parts centered. This double play has been designated as $2c$.

The stationary sliding surface 6 has a radius of curvature $r_2$ in axial direction or plane, and the block sliding surfaces 7, as shown in Fig. 3, have the same radius of curvature as the surface 6.

In peripheral direction, however, that is, as shown in Fig. 4, the radius of curvature $r_1$ of the blocks is less than the radius $r_2$ of the stationary sliding surface 6. The stationary sliding surface 6 in this case is of true spherical form, that is, with the same radius of curvature in all directions.

It will be evident from Fig. 3 that if the bearing is constructed in this manner, a large effective bearing surface is provided when the bearing is not rotating, the rotating sliding surface contacting the stationary sliding surface across the whole width of the bearing. From Fig. 3 it also is clear that the play between the respective sliding surfaces does not increase in axial direction, wherefore the disadvantage above described with reference to such construction is eliminated.

Since the rotating sliding surface that is, the block surfaces 7, have a smaller radius of curvature than the stationary sliding surface 6 in peripheral relation, the disadvantage of adhesion of the blocks to the stationary surface above brought out is eliminated. The difference in size between the radius of curvature of the rotating and stationary sliding surfaces in peripheral direction may be given any desired value by varying the position of the supporting surfaces $a$, $b$ and 10, respectively, relative to the axis of rotation.

Figs. 5 and 6 illustrate another embodiment of the invention. The figures correspond to Figs. 3 and 4, being likewise schematic and likewise exaggerating the amount of play for purposes of illustration. The blocks and the driving ring have also in this case been indicated only by dash-and-dot lines and the blocks are in their mid-positions. In this embodiment the sliding surface 6 formed in the stationary part of the block has been provided with different radii of curvature in peripheral and axial directions while the radii of curvature of the block sliding surfaces have the same value in all directions. It will be evident that the axial radii of curvature as shown by Fig. 5 are independent of the peripheral radii of curvature as shown in Fig. 6 and in certain cases it may be preferable, for example, for sustaining great axial loads with bearings of small width, to give the sliding surfaces smaller axial than peripheral radii of curvature. So far as possible, the axial radii of curvature ought to have their centers adjacent to the axis of the bearing so that the load-sustaining oil films produced between the sliding surfaces are not unfavorably influenced by lack of alignment, for example, of the journal shaft.

In constructing bearings in accordance with this invention we prefer to include the improvements set forth in the following applications, the disclosures of which may be considered as incorporated in this application: Janson Serial No. 479,621, filed September 4, 1930; Wallgren Serial No. 544,767, filed June 16, 1931; Wallgren Serial No. 591,467, filed February 8, 1932; and Wallgren Serial No. 612,447, filed May 20, 1932.

It will be clear that the invention is not limited to the embodiments specifically disclosed.

What we claim is:

1. A radial bearing comprising inner and outer members and a plurality of bearing blocks therebetween, said blocks and one of said members having cooperating irregular surfaces to cause the blocks to tilt to produce wedge-shaped oil spaces, said blocks and the other of said members having sliding surfaces, said sliding surfaces having radii of curvature which are equal in an axial plane and unequal in a transverse plane, and means to permit and limit shift of position between said blocks and said one of said members.

2. A radial bearing comprising inner and outer members and a plurality of bearing blocks therebetween, said blocks and one of said members having cooperating irregular surfaces to cause the blocks to tilt to produce wedge-shaped oil spaces, said blocks and the other of said members having sliding surfaces, said sliding surfaces having radii of curvature which are equal in an axial plane and unequal in a transverse plane, the radii of curvature of the blocks being the same in the axial and transverse planes, and means to permit and limit shift of position between said blocks and said one of said members.

3. A radial bearing comprising inner and outer members and a plurality of bearing blocks therebetween, said blocks and said inner member having cooperating irregular surfaces to cause the blocks to tilt to produce wedge-shaped oil spaces, said blocks and said outer member having sliding surfaces, said sliding surfaces having radii of curvature which are equal in an axial plane and unequal in a transverse plane, the radii of curvature of said outer member being the same in the axial plane and the transverse planes, and means to permit and limit shift of position between said blocks and said inner member.

4. A bearing of the radial type comprising an inner member, an outer member spaced radially from the inner member, a plurality of bearing blocks having operative positions between said members, said inner member and said blocks having adjacent cooperating irregular surfaces for causing rotation in one direction to tilt the blocks one way and rotation in the other direction to tilt the blocks the other way, the outer member and said blocks having adjacent cooperating curved bearing surfaces, said bearing surfaces having radii of curvature which are equal in an axial plane and unequal in a transverse plane, and means for permitting and limiting shift of position between said blocks and said inner member.

5. A bearing of the radial type comprising an inner member, an outer member spaced radially from the inner member, a plurality of bearing blocks having operative positions between said members, said inner member and said blocks having adjacent cooperating irregular surfaces for causing rotation in one direction to tilt the blocks one way and rotation in the other direction to tilt the blocks the other way, the outer member and said blocks having adjacent cooperating curved bearing surfaces, said bearing surfaces having radii of curvature which are equal in an axial plane and unequal in a transverse plane, and means for permitting and limiting shift of position between said blocks and said inner member, the radii of curvature of the block surfaces being the same in the axial plane and the transverse plane.

6. A bearing of the radial type comprising an inner member, an outer member spaced radially from the inner member, a plurality of bearing blocks having operative positions between said members, said inner member and said blocks having adjacent cooperating irregular surfaces for causing rotation in one direction to tilt the blocks one way and rotation in the other direction to tilt the blocks the other way, the outer member and said blocks having adjacent cooperating curved bearing surfaces, said bearing surfaces having radii of curvature which are equal in an axial plane and unequal in a transverse plane, and means for permitting and limiting shift of position between said blocks and said inner member, the radii of curvature of the surface of the outer member being the same in the axial plane and the transverse plane.

7. A radial bearing comprising spaced bearing members and a bearing block therebetween, one of said members being grooved to form a bearing shoulder and said block having a bearing surface cooperating with said shoulder to tilt the block, said one of said members having a surface for contacting said block to carry the block in rotation therewith, the other of said members and said bearing block having curved surfaces, the radii of curvature of the respective surfaces being equal in an axial plane and unequal in a transverse plane.

8. A radial bearing comprising spaced bearing members and a bearing block therebetween, one of said members being grooved to form a bearing shoulder and said block having a bearing surface cooperating with said shoulder to tilt the block, said one of said members having a surface for contacting said block to carry the block in rotation therewith, the other of said members and said bearing block having curved surfaces, the radii of curvature of the respective surfaces being equal in an axial plane and unequal in a transverse plane, the block surface being truly spherical.

9. A radial bearing comprising spaced bearing members and a bearing block therebetween, one of said members being curved to form a bearing shoulder and said block having a bearing surface cooperating with said shoulder to tilt the block, said one of said members having a surface for contacting said block to carry the block in rotation therewith, the other of said members and said bearing block having curved surfaces, the radii of curvature of the respective surfaces being equal in an axial plane and unequal in a transverse plane, the curved surface of said one of said members being truly spherical.

10. A radial bearing comprising spaced bearing members and bearing blocks therebetween, one of said members and said blocks having tilting shoulders, said one of said members having a surface for contacting said blocks to guide them peripherally, and the other of said members and said blocks having co-operating curved sliding surfaces, the radii of curvature of the respective sliding surfaces being equal in an axial plane and unequal in a transverse plane.

AUGUST GUNNAR FERDINAND WALLGREN.
CARL GUSTAF JANSON.